US009798220B2

(12) United States Patent
Henry et al.

(10) Patent No.: US 9,798,220 B2
(45) Date of Patent: Oct. 24, 2017

(54) SHUTTER FOR AN INFRARED CAMERA (71) Applicant: Seek Thermal, Inc., Santa Barbara, CA (US)

(72) Inventors: Blake Henry, Santa Barbara, CA (US); Scott Dayton, San Jose, CA (US); William J. Parrish, Santa Barbara, CA (US); David C. Lindberg, Portland, OR (US)

(73) Assignee: Seek Thermal, Inc., Santa Barbara, CA (US)

( * ) Notice: Subject to any disclaimer, the term of this patent is extended or adjusted under 35 U.S.C. 154(b) by 30 days.

(21) Appl. No.: 14/817,689

(22) Filed: Aug. 4, 2015

(65) Prior Publication Data

US 2016/0044224 A1 Feb. 11, 2016

Related U.S. Application Data (60) Provisional application No. 62/033,330, filed on Aug. 5, 2014.

(51) Int. Cl.
*H04N 5/225* (2006.01)
*G03B 9/10* (2006.01)

(52) U.S. Cl.
CPC .............. *G03B 9/10* (2013.01); *H04N 5/2254* (2013.01)

(58) Field of Classification Search
None
See application file for complete search history.

(56) References Cited

U.S. PATENT DOCUMENTS

| 4,319,823 | A | | 3/1982 | Hashimoto |
| 5,926,664 | A | | 7/1999 | Taillie et al. |
| 6,123,468 | A | | 9/2000 | Furlani et al. |
| 8,333,521 | B2 | | 12/2012 | Viglione |
| 2002/0149290 | A1 | * | 10/2002 | Kurosu ................. H02K 33/16 310/261.1 |

(Continued)

FOREIGN PATENT DOCUMENTS

| DE | 3023945 | | 1/1982 | |
| GB | 2226453 | A * | 6/1990 | ............. H01F 7/145 |

OTHER PUBLICATIONS

PCT International Search Report for PCT/US2015/042376 mailed Oct. 23, 2015 in 13 pages.

(Continued)

*Primary Examiner* — Justin P Misleh
(74) *Attorney, Agent, or Firm* — Knobbe Martens Olson & Bear LLP (57) ABSTRACT A shutter for an optical system, such as a small infrared camera, for alternately blocking and exposing an optical sensor to light includes an electrically conductive coil, having a center long axis, a magnet element rotatably mounted within the coil with an axis of rotation perpendicular to the center long axis of the coil, a shutter flag element connected to the magnet element, and a shutter base element supporting the shutter flag, magnet, and coil. Energizing the coil in a first manner causes the rotatable magnet to rotate from a first position to a second position and energizing the coil in a second manner returns the magnet to the first position, causing the flag to alternately block and expose the optical sensor.

8 Claims, 7 Drawing Sheets (56) References Cited

U.S. PATENT DOCUMENTS

| | | | |
|---|---|---|---|
| 2004/0222709 A1* | 11/2004 | Naganuma | G03B 9/14 |
| | | | 310/36 |
| 2006/0219940 A1* | 10/2006 | Pemberton | G03B 9/16 |
| | | | 250/472.1 |
| 2007/0172231 A1 | 7/2007 | Durfee | |
| 2010/0200751 A1 | 8/2010 | Zahn et al. | |
| 2010/0309369 A1* | 12/2010 | Jarvis | H04N 5/2254 |
| | | | 348/371 |
| 2015/0312488 A1 | 10/2015 | Kostrzewa et al. | |
| 2015/0319378 A1 | 11/2015 | Hoelter et al. | |
| 2016/0044224 A1 | 2/2016 | Henry et al. | |
| 2016/0061883 A1 | 3/2016 | Engberg et al. | |

OTHER PUBLICATIONS

Advanced Optical Bi-Stable Shutters.
MicroAct Magnetic Actuator—0.4g (webpage).

* cited by examiner

SHUTTER FOR AN INFRARED CAMERA

CROSS-REFERENCE TO RELATED APPLICATIONS

This application claims the benefit of priority to U.S. Prov. Pat. App'n No. 62/033,330, entitled "Shutter for an Infrared Camera," filed Aug. 5, 2014, which is incorporated by reference herein in its entirety.

BACKGROUND

Field

This application relates to optical elements for infrared cameras and in particular to a compact shutter suitable for small infrared cameras.

Description of Related Art

The increasing availability of high-performance, low-cost uncooled infrared (IR) or thermal imaging sensors, such as microbolometer focal plane arrays, is enabling the design and production of mass-produced, consumer-oriented IR cameras. Thermal imaging sensors have long been expensive and difficult to produce, thus limiting the employment of high-performance, long wave thermal imaging to high-value instruments, such as those found in aerospace, military, or large scale commercial applications. Mass-produced, small IR cameras, on the other hand, benefit from compact, low-cost component design.

SUMMARY

Example embodiments described herein have innovative features, no single one of which is indispensable or solely responsible for their desirable attributes. Without limiting the scope of the claims, some of the advantageous features will now be summarized.

In some embodiments, a shutter system is provided for alternately blocking and exposing an optical sensor to light. Various implementations may include an electrically conductive coil, a magnet element that is positioned within an interior portion of the coil and mounted to allow rotation of the magnet element, a shutter flag mechanically coupled to the magnet element so that rotation of the magnet element induces movement of the shutter flag, and/or a shutter base element supporting the shutter flag, the magnet element, and the coil. In certain implementations, energizing the coil in a first polarity may cause the rotatable magnet to be positioned in a first position and energizing the coil in a second polarity may cause the rotatable magnet to be positioned in a second position. The rotatable magnet can cause the shutter flag to be positioned to block the optical sensor in the first position, and the rotatable magnet can cause the shutter flag to expose the optical sensor in the second position.

Some embodiments may include at least one magnetic bias element. The magnetic bias element can be configured to provide a magnetic field that causes the magnet element to position the shutter flag in a biased position when the coil is not energized or when the coil is energized with a particular energy. In some implementations, the biased position of the shutter flag blocks the optical sensor. In some implementations, the biased position of the shutter flag exposes the optical sensor. In certain implementations, the at least one magnetic bias element is disposed outside the coil. In certain implementations, the magnetic bias element comprises at least two posts of a magnetic material, e.g., magnetically susceptible steel, disposed perpendicular to a plane of rotation of the shutter flag and symmetrically arranged about the coil. In some implementations, the magnetic bias element comprises a plurality of electromagnets positioned outside the coil.

In some embodiments, the shutter flag may include a flat-bladed flag portion, a sleeve portion containing the magnet element, and an arm that connects the sleeve portion to the flag portion. In certain implementations, the sleeve portion may include at least two physical features that serve as pivot points for rotation of the magnet element and the sleeve portion.

In certain embodiments, the shutter base may support the sleeve portion of the shutter flag supporting the magnet. The shutter base can be configured to support the shutter flag in a way that allows the shutter flag to rotate. For example, the shutter base can include mechanical features that provide support for the pivot points of the shutter flag, thus allowing the shutter flag to rotate around the pivot points. In some embodiments, the shutter base may include a first support element, including at least two tabs extending from the support element, the at least two tabs spaced apart by a distance configured to mate with the physical features on the sleeve portion of the shutter flag. The at least two tabs can include at least two mating receptacles for the pivot points of the sleeve portion. The sleeve portion may be at least partially disposed between the tabs of the shutter base with the pivot points mechanically seated in the mating receptacles, the pivot points providing points of contact with the tabs, with the pivot points rotatable in the mating receptacles. In certain implementations, the pivot points in the mating receptacles are the only points of contact with the tabs. In some embodiments, the tabs of the first support element may be disposed on the opposite side from the mating receptacles as a two-part mounting structure for the coil. When assembled, the magnet element disposed in the sleeve portion of the shutter flag can be positioned in an interior portion of the coil, the coil supported by the shutter base. In certain implementations, the shutter base may include at least two additional support elements spaced apart by a width slightly greater than the coil, connected to and extending away from the first support element. The at least two additional support elements can be configured to provide additional mechanical support to the shutter base when installed, for example, on a printed circuit board containing an optical sensor.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The several views of the drawings show exemplary embodiments of a shutter system and its various components. Variations in size and shape, as well as assembly details different than the exemplary implementation are possible that will fall within the scope of this disclosure. The exemplary views are not intended as limiting in any way. For example, the shutter can be configured to be positionable in a plurality of positions that completely expose an optical sensor, completely block the optical sensor, and partially block and partially expose the optical sensor.

In some embodiments, the disclosed shutter system provides a number of advantages over an apparatus configured to convert continuous rotary motion to reciprocating rotary motion for a shutter.

In some embodiments, the disclosed shutter system may provide the desired functionality of alternately exposing and blocking an optical sensor without a motion conversion apparatus. Advantageously, the disclosed shutter has as its natural motion reciprocating rotary motion that is suitable for a shutter.

In some embodiments, the disclosed shutter system may be advantageous for existing IR camera cores to replace an existing shutter system employing a rotary solenoid to achieve reciprocating rotary motion for a shutter. For example, rotary solenoids may have higher mass and power consumption than the disclosed shutter system, so replacing the existing shutter system with the disclosed shutter system can improve performance, durability, and consistency of an existing IR camera core.

The disclosed shutter systems provide a number of advantages. For example, some embodiments of the disclosed shutter systems include a single moving part, a shutter flag comprising a magnet that rotates in response to changes in magnetic fields in the shutter system. Utilizing a single moving part can increase durability and longevity of a shutter system. It may also reduce manufacturing costs.

Another advantage of the at least some embodiments of the disclosed shutter systems is the simple control of the shutter system. For example, some embodiments of the disclosed shutter systems operate by simply changing a voltage and/or current applied to an electrically conductive coil. Changes in the voltage and/or current cause changes in magnetic forces experienced by the magnet element in the shutter flag, inducing rotation of the shutter flag. Thus, the shutter system can be controlled by providing two different electrical signals to the coil (e.g., a positive polarity and a negative polarity, a positive polarity and ground or neutral signal, a negative polarity and ground, etc.).

In certain embodiments, the shutter system can advantageously be configured to leave the shutter flag in a predetermined or targeted position in the event of a power failure to the coil through the use of one or more magnetic biasing elements. The magnetic biasing elements can be used to bias the shutter flag in a targeted, selected, or desired position (e.g., blocking or exposing the optical sensor). The magnetic bias elements may also increase simplicity and reliability of the shutter system such as when the magnetic bias elements are permanent magnets. In such embodiments, the magnetic bias elements do not need to be controlled or to receive power, thereby increasing simplicity and reliability of the shutter system. For example, the magnetic bias elements provide a relatively constant contribution to the magnetic field experienced by the magnet element. When power is not delivered to the shutter system (e.g., due to a power failure, when the camera is off, etc.), the magnetic bias elements continue to generate a magnetic field to position the shutter flag in a targeted position.

Another advantage of at least some of the disclosed shutter systems is the reduced cost of manufacture due at least in part to the resilient and simple design of the shutter flag and shutter base. For example, some embodiments of the shutter system include rotation stops to determine at least one stopping point of rotation of the shutter flag. These rotation stops can also include physical features that center or align the shutter flag to correct for deviations from a targeted or desired position. For example, if the shutter flag rotates off-axis, the rotation stops can be used to correct the rotation of the shutter flag to be on-axis. As another example, the shutter base can be configured to use a single structure to both provide support for the coil and to provide mating receptacles for pivot points of the shutter flag. This structure can thus operate to secure the shutter flag and the coil in a robust fashion.

FIGS. 1A-1D illustrate a diagram of a portion of a shutter system 100 to demonstrate the basic operation of the shutter system 100. A permanent magnet 102 is mounted within an interior of a coil 101. The magnet 102 may be configured to rotate on an axis (e.g., extending into the page as illustrated) approximately perpendicular to a longitudinal axis X of coil 101. The magnet 102 in some embodiments may be a cylinder made from permanent magnet materials. In some embodiments, the magnet 102 may be any other shape other than a cylinder, such as a sphere, cube, cuboid, rectangular prism, cone, etc. In some embodiments, the magnet 102 can be positioned within a sleeve portion of a shutter flag to couple rotation of the magnet 102 to the shutter flag of the shutter system 100.

The shutter system 100 can include magnetic bias elements 103. The magnetic bias elements 103 can be permanent magnets or electromagnets. In some embodiments, the magnet 102 is biased in a first position by at least two magnetic bias elements 103. In certain implementations, the first position can be defined as the position of the magnet 102 when the coil 101 is not energized. The magnetic bias elements 103 can be mounted so that a longitudinal axis of each of the magnetic bias elements 103 is perpendicular to the plane of rotation of the magnet 102. For example, the direction from magnetic north to magnetic south (e.g., the direction of the magnetic field) within the magnetic bias elements 103 can be approximately perpendicular to the plane of rotation of the magnet 102. As another example, the direction of the magnetic field in the magnetic bias elements 103 can be approximately perpendicular to the direction of the magnetic field in the center of the coil 101. The magnetic bias elements 103 can be positioned at adjacent opposite corners of the coil 101. The magnetic bias elements 103 serve to bias the magnet 102 in a predetermined or desired position when the coil 101 is off or not energized. In some embodiments, the magnetic bias elements 103 comprise electromagnets. The electromagnets can be controlled to bias the position of the magnet 102 in a variety of desired or targeted positions. The magnetic bias elements 103 can be controlled, for example, in conjunction with the coil 101 to cause the magnet 102 to be positioned in a plurality of positions to achieve desired or targeted coverage of an optical sensor of a camera. In certain implementations, the magnetic bias elements 103 are electromagnets that receive a substantially constant voltage, current, and/or electrical power.

The coil 101 can be switchably connected to a voltage source and ground. Applying a voltage or otherwise energizing the coil 101 in one polarity can be configured to cause the magnet 102 to rotate in a first direction and switching the polarity can be configured to cause the magnet 102 to rotate in the opposite direction. The coil 101 may otherwise be energized in a first manner to rotate the magnet 102 and coupled shutter components from a first position to a second position relative to an optical sensor and in a second manner to rotate the magnet 102 from the second position to the first position, or to a third position.

In certain implementations, the shutter system 100 is part of a camera core that includes a microcontroller with digital outputs. Connecting one end of the coil 101 to ground and the other to a controller digital output, and activating the output can cause a rotation of the magnet 102 in one direction; and switching the ground and output using a switch circuit to opposite ends of the coil 101 can cause rotation of the magnet 102 in the other direction.

Figure 1A:
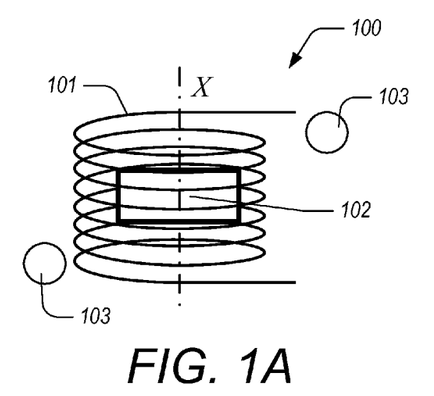
FIGS. 1A-1D illustrate schematically the operation of certain embodiments of an example shutter system.
Figure 1B:
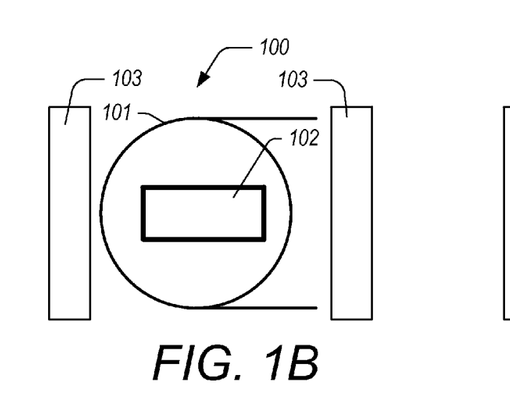
Figure 1C:
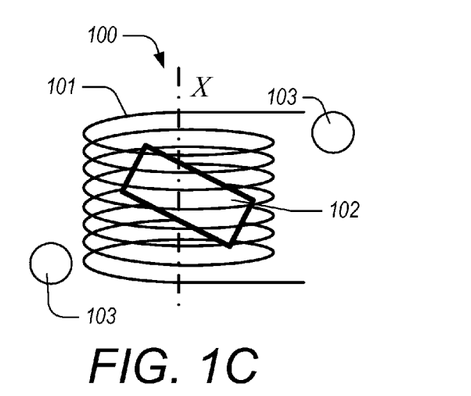
Figure 1D:
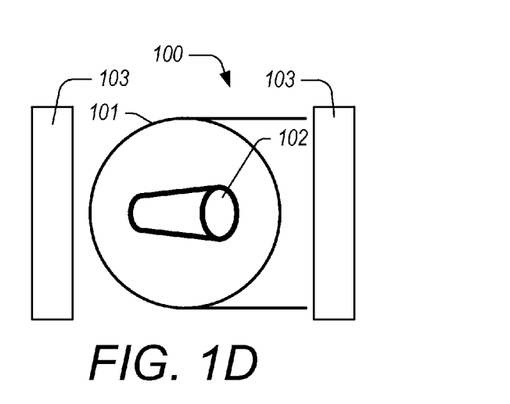

To illustrate operation of the shutter system 100, FIGS. 1A-1D illustrate the shutter system 100 in a first state in FIGS. 1A and 1B and in a second state in FIGS. 1C and 1D. FIGS. 1A and 1C respectively illustrate top views of the shutter system 100 and FIGS. 1B and 1D respectively illustrate side views of the shutter system 100. The first state of the shutter system 100 can correspond, for example, to the coil 101 not being energized and the magnetic bias elements 103 positioning the magnet 102 in a first position (e.g., to block an optical sensor). The second state of the shutter system 100 can correspond, for example, to the coil 101 being energized to position the magnet 102 in a second position (e.g., to expose an optical sensor). Similarly, energizing the coil 101 can correspond to the shutter system 100 exposing an optical sensor and not energizing the coil 101 can correspond to the shutter system 100 blocking the optical sensor.

In an illustrative embodiment, the coil 101 may be about 3.57 mm long (e.g., as measured along the axis X) with an inner diameter of 4.5 mm and may be wound from 42 AWG enameled copper magnet wire. The magnet 102 may be a few millimeters in size to fit within the coil 101. For example, the magnet 102 can be about 1.5 mm long and a few millimeters in diameter (e.g., about 1.5 mm in diameter). In some embodiments, the sleeve portion for holding the rotatable magnet 102 may have an inner diameter that is about 1.5 mm or less. In an exemplary embodiment, the magnetic bias elements 103 may be galvanized steel posts with a diameter of about 0.8 mm and/or a length of about 5 mm.

Other sizes are possible for the elements of the shutter system 100. For example, the coil 101 can have a length that is at least about 0.5 mm and/or less than or equal to about 50 mm, at least about 1 mm and/or less than or equal to about 40 mm, at least about 2 mm and/or less than or equal to about 30 mm, or at least about 3 mm and/or less than or equal to about 20 mm, or any size within these ranges. The inner diameter of the coil 101 can be, for example, at least about 0.5 mm and/or less than or equal to about 50 mm, at least about 1 mm and/or less than or equal to about 40 mm, at least about 2 mm and/or less than or equal to about 30 mm, or at least about 3 mm and/or less than or equal to about 20 mm, or any size within these ranges. Other gauges of wire can be used for the coil 101 as well.

As stated above, the magnet 102 can be sized to fit within the coil 101. Accordingly, the magnet 102 can have a length that is at least about 0.5 mm and/or less than or equal to about 45 mm, at least about 1 mm and/or less than or equal to about 35 mm, at least about 2 mm and/or less than or equal to about 30 mm, or at least about 3 mm and/or less than or equal to about 20 mm, or any size within these ranges. The magnet 102 can have a diameter that is at least about 0.5 mm and/or less than or equal to about 40 mm, at least about 1 mm and/or less than or equal to about 30 mm, at least about 2 mm and/or less than or equal to about 25 mm, or at least about 3 mm and/or less than or equal to about 20 mm, or any size within these ranges.

The magnetic bias elements 103 can have a diameter that is at least about 0.1 mm and/or less than or equal to about 10 mm, at least about 0.2 mm and/or less than or equal to about 5 mm, at least about 0.4 mm and/or less than or equal to about 2 mm, or at least about 0.6 mm and/or less than or equal to about 1 mm, or any size within these ranges. The magnetic bias elements 103 can have a length that is at least about 0.5 mm and/or less than or equal to about 50 mm, at least about 1 mm and/or less than or equal to about 40 mm, at least about 2 mm and/or less than or equal to about 30 mm, or at least about 3 mm and/or less than or equal to about 20 mm, or any size within these ranges.

Example Shutter Flag

Figures 2A, 2B:
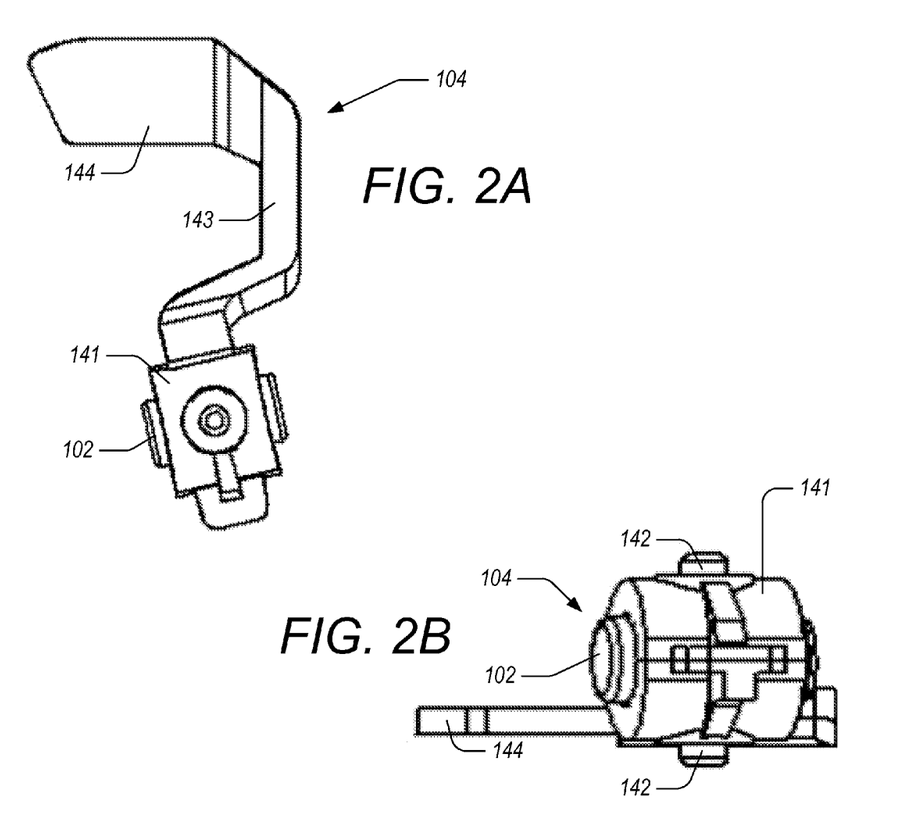
FIGS. 2A-2C illustrate several views of an example embodiment of a shutter flag.
Figure 2C:
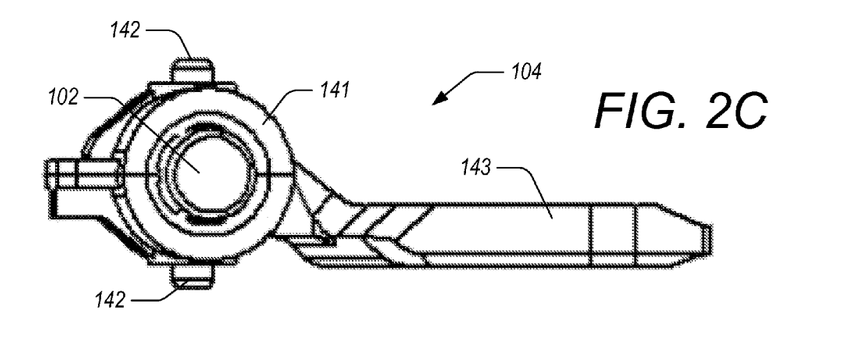

FIGS. 2A-2C illustrate an exemplary embodiment of a shutter flag 104. The shutter flag 104 includes a sleeve portion 141, an arm 143, and a flag portion 144. The sleeve portion 141 is configured to support the magnet 102 in a way that rotation of the magnet 102 is converted into rotation of the shutter flag 104. In some embodiments, the magnet 102 is press fit into the sleeve portion 141. Other coupling means are possible as well. For example and without limitation, the magnet 102 can be mechanically coupled to the sleeve portion 141 using adhesives, set-screws, or the like. The arm 143 is mechanically and rigidly coupled to the sleeve portion 141, extending from the sleeve portion 141. The arm 143 connects the flag portion 144 to the sleeve portion 141 so that rotation of the sleeve portion 141 results in movement of the flag portion 144.

When installed in a camera core, the shutter flag 104 is configured such that when the magnet 102 rotates (e.g., when a magnetic field provided by the coil 101 and/or the magnetic bias elements 103 generates a torque on the magnet 102), the flag portion 144 alternately covers and uncovers an area that in the camera core containing an optical sensor. In a particular embodiment, the optical sensor is an IR Focal Plane Array (FPA). The flag portion 144 may be of any suitable geometric configuration including, but not limited to, rectangular, square, or any other regular or irregular shape. In some embodiments, the flag portion 144 can cover an area a few millimeters on a side. For example, the flag portion 144 can cover an area at least about 1.5 mm on a side. In some embodiments, the flag portion can cover an area at least about 0.2 mm and/or less than or equal to about 15 mm on a side, at least about 0.4 mm and/or less than or equal to about 10 mm on a side, at least about 0.8 mm and/or less than or equal to about 5 mm on a side, or at least about 1 mm and/or less than or equal to about 2 mm on a side, or any size within these ranges.

The sleeve portion 141 includes pivot points comprising two features 142 extending from the sleeve portion 141 on opposite sides of the sleeve portion 141. The pivot points 142 may be constructed of a material which has low friction and low wear, such as polyetherimide, or other similar thermoplastics or polyimides. For example, a shutter for a commercial, mass-produced IR camera core may be expected to last 2 years under warranty. A shutter, depending on the mode of operation, may need to be cycled as fast as 30 Hz in a chopper-type mode. Thus the materials used may operate at 30 Hz, in long continuous time periods, and last several million cycles for both single and continuous cycle operating modes. The shutter flag 104 may be made of a material which is sufficiently rigid or stiff that flag portion 144 rotates smoothly. The flag portion 144 can be configured to be opaque to light in a wavelength range of interest. For example, when used in an IR camera core, the flag portion 144 can be opaque to infrared light, such as longwave IR (e.g., light having a wavelength between about 6 microns and about 13 microns). In one embodiment, the flag portion 144 can be made of polyetherimide or other similar thermoplastics or polyimides.

Example Shutter Base

Figure 3:
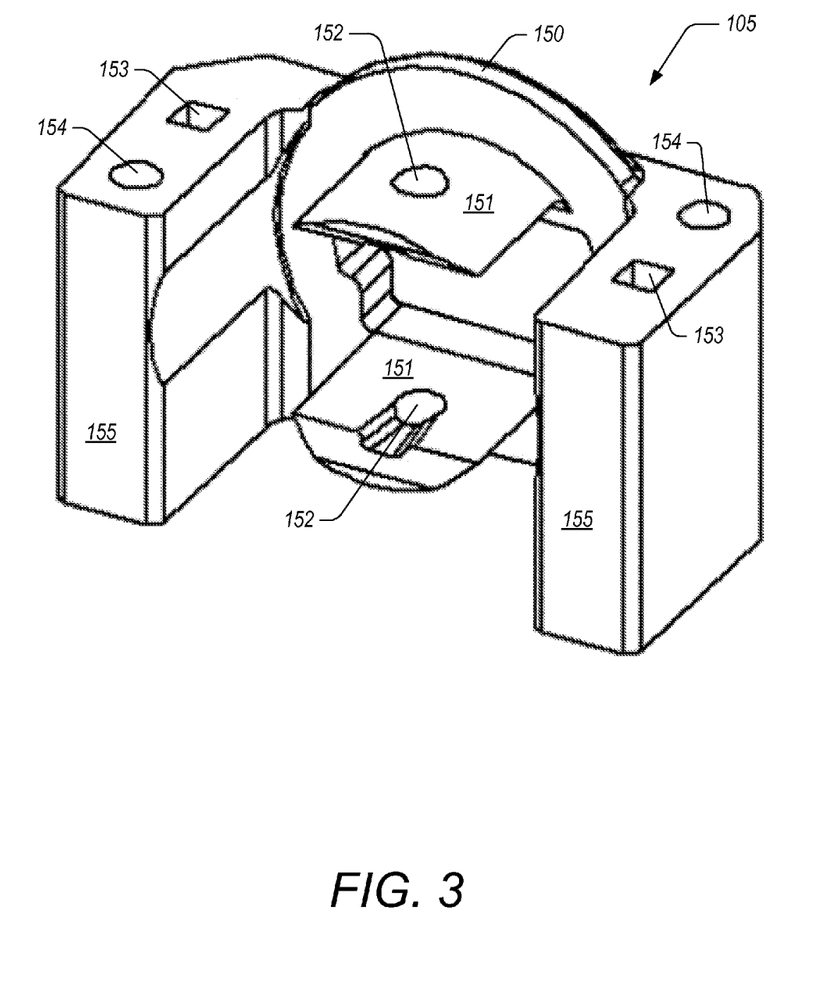
FIG. 3 illustrates an embodiment of a shutter base.

FIG. 3 depicts an exemplary shutter base 105 for rotatably supporting the shutter flag 104 with the magnet 102 and supporting the coil 101. In some embodiments, the shutter base 105 can be configured to provide support for the magnetic biasing elements 103. In some embodiments, the shutter base 105 can be configured to provide support for electrical conductors 108.

The shutter base 105 includes a first support element 150, which includes at least two tabs 151 extending away from the first support element 150. These tabs 151 include receptacles or recesses 152 configured to couple to the pivot points 142 on the shutter flag 104. The tabs 151 are spaced apart sufficiently to allow free rotation of the shutter flag 104 about the receptacles 152. The exemplary base 105 may also include additional support elements 155 extending away from the first support element 150 in the same direction as the tabs 151 and spaced apart sufficiently to accommodate the dimensions of the coil 101. In some embodiments, the additional support elements 155 can extend in one or more additional and/or different directions than those illustrated in FIG. 3. These additional support elements 155 may include mounting holes 154 for the magnetic bias elements and mounting holes 153 for electrical connection posts.

Figure 6:
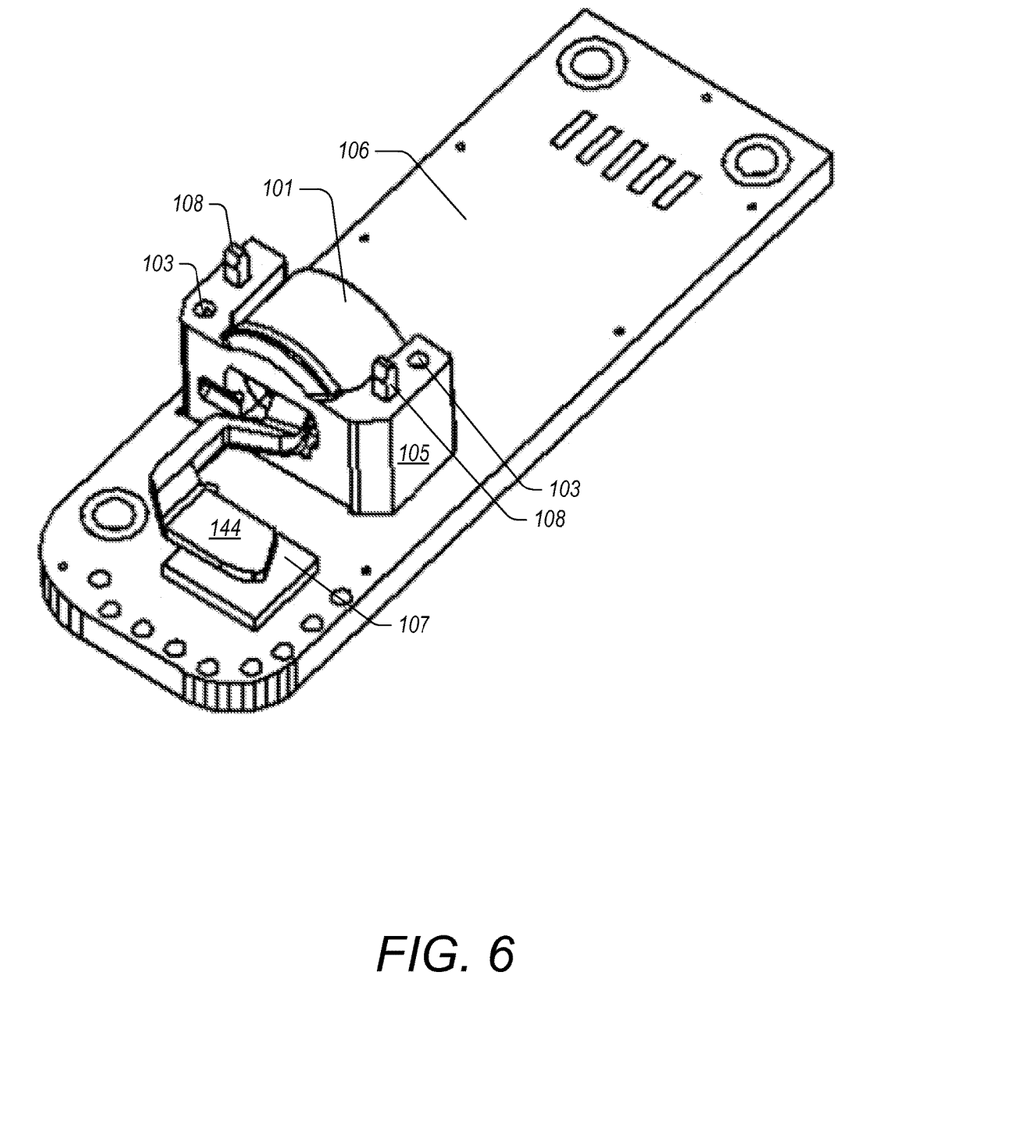
FIG. 6 illustrates an example embodiment where the assembly of FIG. 5 is mated to a printed circuit board that includes an optical sensor, according to an illustrative embodiment.

When installed in a camera core (e.g., an IR camera core), an example of which is described herein with reference to FIG. 6, the bottom of the base 105 can be substantially flat for mounting on a printed circuit board ("PCB") 106. Electrical connection posts 108 can connect to the coil 101 and to pads on PCB 106. The electrical connection posts 108 can be configured to contact electrically conductive pads on the PCB 106 when the base 105 is mounted to the PCB 106. In some embodiments, the electrical conductors 108 may be compliant press-fit terminals and the shutter base 105 can be attached to PCB 106 by way of the press-fit terminals 108. The shutter base 105 may comprise a unitary piece or one or more pieces coupled together or otherwise assembled to provide the structures and to perform the functions described herein.

Figure 4A:
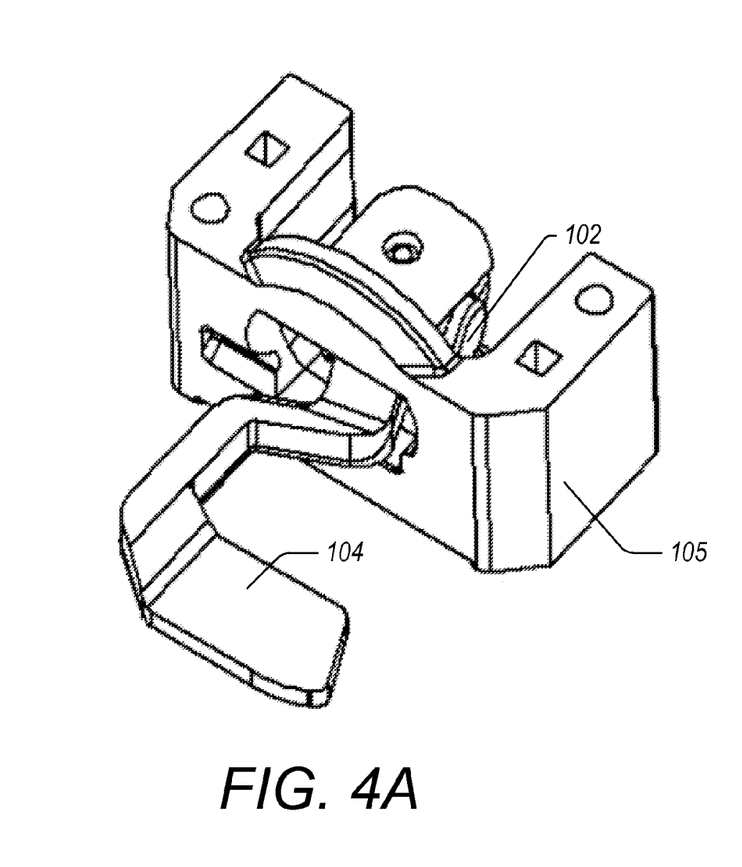
FIGS. 4A and 4B illustrate the example shutter flag of FIGS. 2A-2C and the example shutter base of FIG. 3 mated together, according to an illustrative embodiment.
Figure 4B:
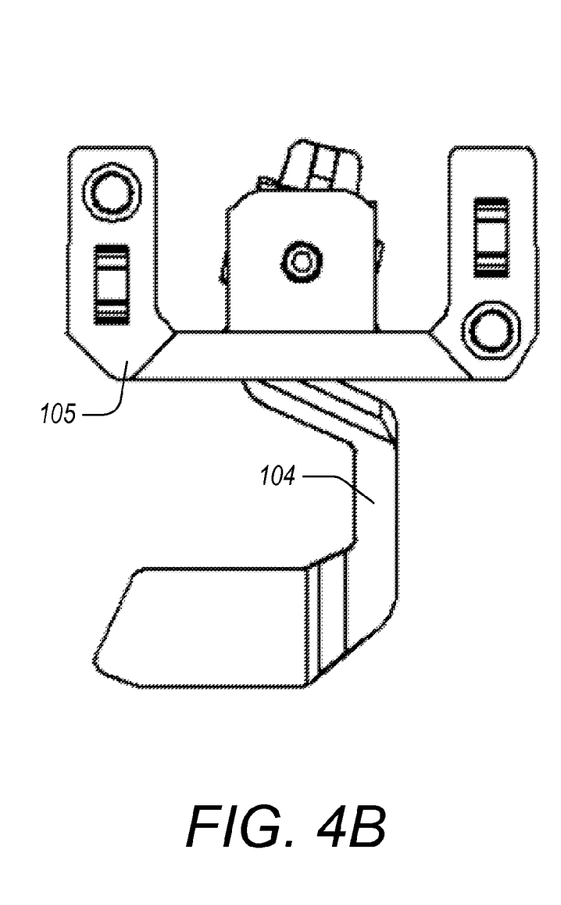

FIGS. 4A and 4B illustrate shutter flag 104 mating with shutter base 105. In some embodiments, the only points of contact between the shutter flag 104 and the shutter base 105 may be the pivot points 142 of the shutter flag 104 with the receptacles 152 of the shutter base 105. The arm 143 of the shutter flag 104 extends outward (e.g., away from the first support element 150 of the shutter base 150) from the tabs 151 in a space or aperture allowing for the targeted or desired rotation range. In certain implementations, the flag portion 144 of the shutter flag 104 can move on the order of a few millimeters. In some embodiments, the pivot points 142 of the shutter flag 104 are pressed into the receptacles 152 by pushing the tabs 151 apart until the pivot points 142 and receptacles 152 mate, and the restoring force or tension of the tabs 151 retains the shutter flag 104.

As an example, the flag portion 144 of the shutter flag 104 can move at least about 0.5 mm and/or less than or equal to about 50 mm, at least about 1 mm and/or less than or equal to about 40 mm, at least about 2 mm and/or less than or equal to about 30 mm, or at least about 3 mm and/or less than or equal to about 20 mm, or any distance within these ranges. The length of the arm 143 from the sleeve portion 141 to the flag portion 144 can be at least about 0.5 mm and/or less than or equal to about 50 mm, at least about 1 mm and/or less than or equal to about 40 mm, at least about 2 mm and/or less than or equal to about 30 mm, or at least about 3 mm and/or less than or equal to about 20 mm, or any length within these ranges.

Example Shutter System

Figure 5:
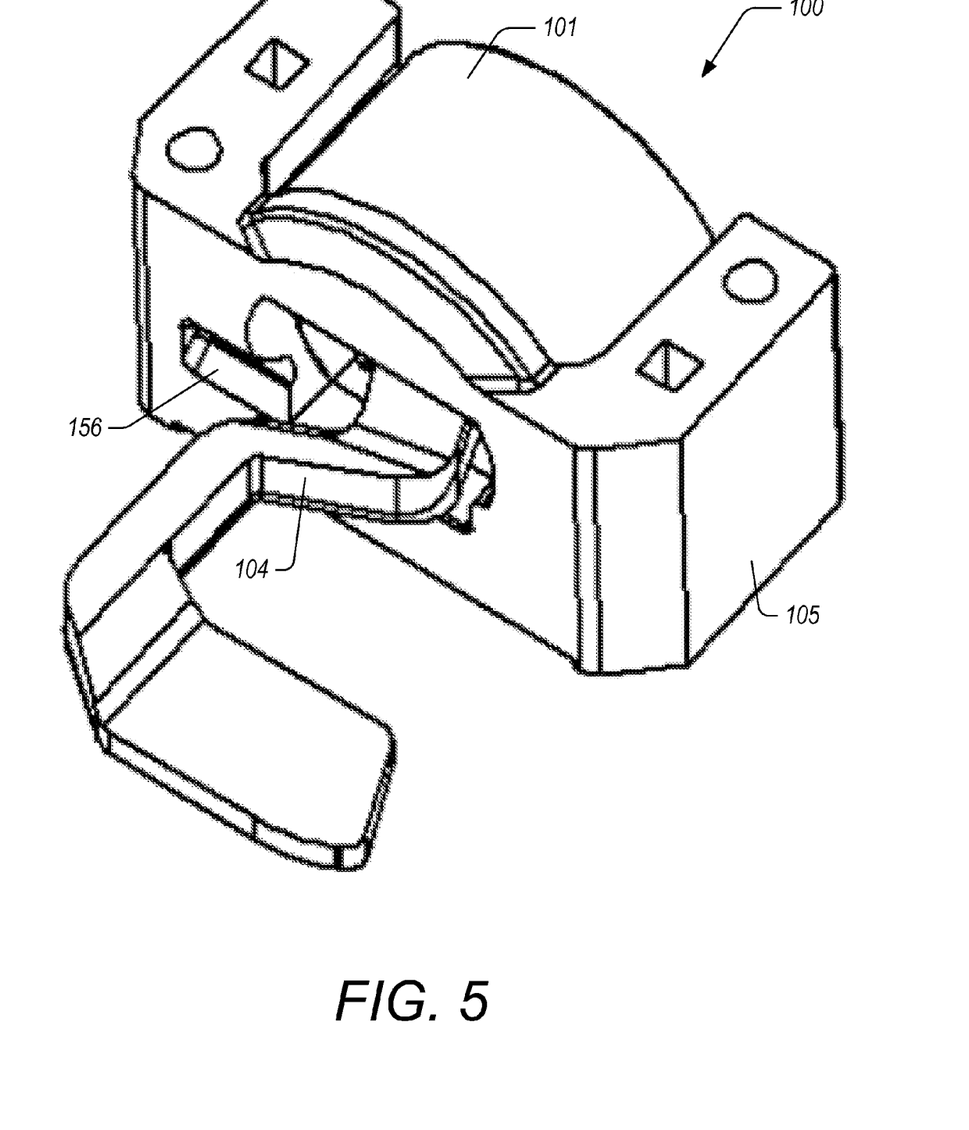
FIG. 5 illustrates a coil mated with the assembly of FIGS. 4A-4B, according to an illustrative embodiment.

Referring to FIGS. 3 and 5, the tabs 151 for the shutter base 105 may be configured to support the inner surface or diameter of the coil 101 on the opposite side of the tabs 151 from receptacles 152. The expansion of the tabs 151 when the shutter flag 104 is pressed into the receptacles 152 may also assist in holding the interior surface of the coil 101 in place. In some embodiments, the coil 101 may be additionally fixed into place once installed on the tabs 151 with a drop or a few drops of an adhesive, or a tap, or other fastener. FIG. 5 illustrates the shutter flag 104, the shutter base 105, and the coil 101 mated together. In the some embodiments of the shutter system 100, a rotation stop 156 can be included as a feature on the shutter base 105. In certain embodiments, this rotation stop 156 is shaped in an opposite or complementary manner to a corresponding portion of the arm 143 of the shutter flag 104. By forming the rotation stop 156 to be complementary to the arm 143, the rotation stop 156 can function to centers the flag arm 143 each time the shutter flag 104 hits the rotation stop 156. For example, the rotation stop 156 may be a recess within the shutter base 105 having beveled side walls configured to position (e.g., center) the flag arm 143 as a mating portion of the flag arm 143 enters the recess.

In some embodiments, the shutter base 105 may have a c-shaped cross-section with an interior opening sized to fit the coil 101. For example, the shutter base 105 can be configured to be in contact with the coil 101 on at least two sides of the coil 101.

In particular embodiments, the shutter flag 104 and/or the shutter base 105 may be made of materials which have sufficient flexibility to allow pressing the sleeve pivot points 142 into the base receptacles 152 and stiff enough to provide adequate retention of the shutter flag 104 in a stable rotation position. The shutter flag 104 and/or the shutter base 105 may further comprise materials that have low friction and wear characteristics for long term high speed rotation of the shutter flag 104 in the shutter base 105. The tabs 151 may be flexible enough yet stiff enough to allow for the shutter flag 104 to be pressed in for installation and then to simultaneously hold the shutter flag 104 and the 101 coil firmly in place. The materials and structures forming the receptacles 152 and the pivot points 142 of the shutter flag 104 can be configured to conform to friction and wear specifications based at least in part on a targeted operating frequency and operational lifetime of the shutter system 100. However, the materials and structures forming the receptacles 152 and the tabs 151 can conform to friction and wear specifications that differ from one another. In some embodiments, the overall structure may support smooth, high-speed cycling of the shutter flag 104. In some implementations, the shutter base 105 may be made from polycarbonate with about 30% glass fiber (e.g., PC GF30) and/or other reinforced polymers, though alternative materials may be used.

Example Shutter System on a Printed Circuit Board

FIG. 6 shows a shutter assembly comprising a shutter flag 104, a shutter base 105 and a coil 101 mated. The shutter assembly also includes magnetic bias elements 103 and electrical connections 108. The assembly is mounted on PCB 106. Optical sensor 107 (e.g., an infrared sensor, such as an IR FPA) is also mounted on PCB 106. The shutter assembly may be configured and mounted such that a flag portion 144 of the shutter flag 104 covers an active area of the optical sensor 107 at one end of the rotation and uncovers it at the other.

Example IR Camera and Shutter System

Figure 7:
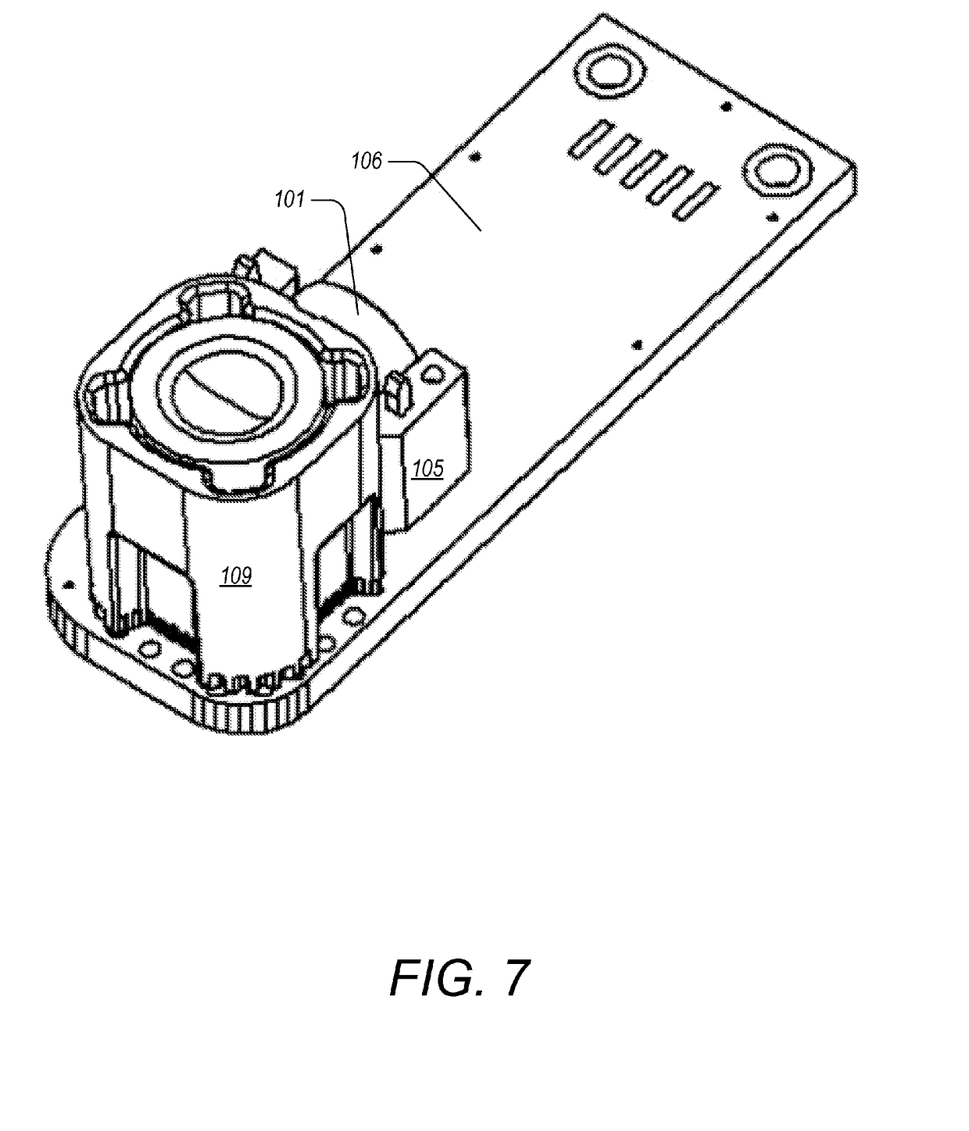
FIG. 7 illustrates an example embodiment of a camera core according to an illustrative embodiment.

FIG. 7 shows an exemplary IR camera core according to an embodiment. Also mounted on PCB 106 is a lens and lens housing 109 creating an optical path to the optical sensor 107. The lens housing 109, in some embodiments, may include a rotation stop (now shown) similar to rotation stop 156 on the shutter base 105 for the other end of the rotation of the shutter flag 104. This rotation stop on the lens housing 109 may be a protrusion, beveled slot, or other stop device mechanically coupled to or integrally formed with the lens housing 109 and configured to contact the shutter flag 104 at the other end of its rotation range. In certain embodiments, the rotation stops can define the extent of rotation of the shutter flag 104. Other elements may be part of the camera core in addition to the ones shown without departing from the spirit and scope of the invention.

Example Operation of a Shutter System

Disclosed below are examples intended to illustrate functionality of the disclosed shutter systems. The following examples should not be read to limit the scope of the disclosed shutter systems.

As a first example, a shutter system can be mounted on a PCB to alternately expose and block an optical sensor. The shutter system includes a shutter base configured to support a coil and a shutter flag. The shutter flag is supported by the shutter base in such a way as to allow rotation of the shutter flag. In a first state, the shutter system exposes the optical sensor, allowing light to reach the optical sensor. In a second state, the shutter system blocks the optical sensor, substantially impeding light from reaching the optical sensor. A power source is electrically coupled to the coil. In the first state, the power source provides a first voltage and/or current to the coil. The coil, in response, generates a magnetic field with first characteristics (e.g., magnitude and direction) that causes a magnet coupled to the shutter flag to experience a torque. The torque on the magnet is transferred to the shutter flag to position the shutter flag in a first position. In the first position, a flag portion of the shutter flag exposes the optical sensor (e.g., an active region of the optical sensor is not covered by the flag portion). In the second state, the power source provides a second voltage and/or current to the coil. In response, the coil generates a magnetic field with second characteristics that causes the magnet to experience a torque different than in the first state, resulting in the shutter flag being positioned in the second position. In the second position, the flag portion of the shutter flag blocks the optical sensor (e.g., an active region of the optical sensor is substantially covered by the flag portion).

The power source can be configured to provide a positive or negative voltage and/or current to the coil. In some embodiments, the first state corresponds to a positive voltage and/or current provided to the coil and the second state corresponds to a negative voltage and/or current provided to the coil, or vice versa. In some embodiments, the first state corresponds to a non-zero voltage and/or current provided to the coil and the second state corresponds to a neutral voltage and/or current (e.g., electrical ground) provided to the coil.

In a second example, the shutter system further includes magnetic biasing elements comprising permanent magnets that generate a magnetic field without utilizing electrical power. Thus, the magnet of the shutter flag experiences forces and torques resulting from the combination of magnetic fields generated by the magnetic biasing elements and the coil. The magnetic biasing elements can be configured such that the magnetic fields caused by the magnetic biasing elements bias the position of the shutter flag in the first or second position. Thus, the shutter system can be configured to expose or block the optical sensor when the power source is off or in a fault condition. The power source can be configured to provide a voltage and/or current sufficiently large so that the dominant force on the magnet of the shutter flag is a result of interaction with the magnetic field generated by the coil when energized by the power source.

In a third example, the shutter base of the shutter system includes a rotation stop so that the shutter flag stops rotating when the shutter flag contacts the rotation stop. This can facilitate control of the shutter system because a precise magnetic field does not need to be generated to cause the shutter flag to be in a desired or targeted position. In a fourth example, a lens housing or the shutter base can include a second rotation stop configured to stop rotation of the shutter flag when the shutter flag reaches the second position. In some embodiments, the magnetic biasing elements cause the shutter flag to contact one of the rotation stops when the coil is not energized.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments whether these features, elements and/or states are included in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y, and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

While the above detailed description has shown, described, and pointed out novel features as applied to illustrative embodiments, it will be understood that various omissions, substitutions, and changes in the form and details of the devices illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A shutter system for alternately blocking and exposing an optical sensor to light, comprising:
    a shutter base;
    an electrically conductive coil having an interior portion and a longitudinal axis, the electrically conductive coil supported by the shutter base;
    a shutter flag rotatably supported by the shutter base;
    a shutter magnet mechanically coupled to the shutter flag such that a torque exerted on the shutter magnet results in a torque on the shutter flag, at least a portion of the shutter magnet being positioned within the interior portion of the electrically conductive coil; and
    at least one magnetic biasing element disposed outside the coil such that magnetic forces between the rotatable magnet and the at least one biasing element holds the flag in a predetermined position when the coil is not energized,
    wherein the shutter base rotatably supports the shutter flag such that the shutter flag has an axis of rotation approximately perpendicular to the longitudinal axis of the coil, and
    wherein energizing the electrically conductive coil in a first polarity exerts a torque on the shutter magnet causing the shutter flag to rotate from a first position to a second position and energizing the electrically conductive coil in a second polarity exerts a torque on the shutter magnet to cause the shutter flag to rotate from the second position to the first position, causing the flag to alternately block and expose the optical sensor, and
    wherein the at least one biasing element comprises at least two steel posts disposed such that the magnetic field within an individual steel post is approximately perpendicular to a plane of rotation of the shutter flag, symmetrically arranged about the coil.

2. The shutter system of claim 1, wherein the shutter base comprises mounting holes for the at least two steel posts.

3. A shutter system for alternately blocking and exposing an optical sensor to light, comprising:
    a shutter base comprising:
        a first support element;
        at least two tabs extending from the first support element, the at least two tabs spaced apart by a distance configured to mate with the at least two pivot features on the sleeve portion of the shutter flag; and
        at least two mating receptacles for the at least two pivot features, wherein the sleeve portion is disposed between the at least two tabs with the at least two pivot features in physical contact with the at least two mating receptacles, the physical contact allowing rotation of the at least two pivot features within the at least two mating receptacles;
    an electrically conductive coil having an interior portion and a longitudinal axis, the electrically conductive coil supported by the shutter base;
    a shutter flag rotatably supported by the shutter base, the shutter flag comprising a flag portion, a sleeve portion configured to mechanically couple the shutter magnet to the shutter flag, and an arm that connects the sleeve portion to the flag portion, the sleeve portion comprising at least two pivot features serving as pivot points for rotation of the magnet; and
    a shutter magnet mechanically coupled to the shutter flag such that a torque exerted on the shutter magnet results in a torque on the shutter flag, at least a portion of the shutter magnet being positioned within the interior portion of the electrically conductive coil,
    wherein the shutter base rotatably supports the shutter flag by mechanically coupling with the sleeve portion such that the shutter flag has an axis of rotation approximately perpendicular to the longitudinal axis of the coil, and
    wherein energizing the electrically conductive coil in a first polarity exerts a torque on the shutter magnet causing the shutter flag to rotate from a first position to a second position and energizing the electrically conductive coil in a second polarity exerts a torque on the shutter magnet to cause the shutter flag to rotate from the second position to the first position, causing the flag to alternately block and expose the optical sensor.

4. The shutter system of claim 3, wherein the at least two tabs are configured to have an outward surface and to form a hollow interior portion, the outward surface of the at latest two tabs configured to support the electrically conductive coil by providing mechanical support to the interior portion of the electrically conductive coil.

5. The shutter system of claim 3, wherein the shutter base further comprises at least two additional support elements spaced apart by a width greater than the coil, the at least two additional support elements connected to and extending away from the first support element.

6. The shutter system of claim 3, wherein the shutter flag and the shutter base are made of materials with at least the following characteristics:
    sufficient flexibility for pressing the sleeve pivot points into the base receptacles and stiff enough to provide adequate retention of the flag and stable rotation position
    low friction and wear characteristics for long term high speed rotation of the flag in the base; and
    at least a portion of the shutter flag is opaque to wavelengths of light including from about 7 μm to about 13 μm.

7. The shutter system of claim 6, wherein the material for the shutter flag comprises polyetherimide.

8. The shutter system of claim 6, wherein the material for the shutter base comprises polycarbonate GF30.

* * * * *